A. J. COLEMAN.
ATTACHMENT FOR ANIMAL TRAPS.
APPLICATION FILED APR. 21, 1913.
1,095,081.
Patented Apr. 28, 1914.
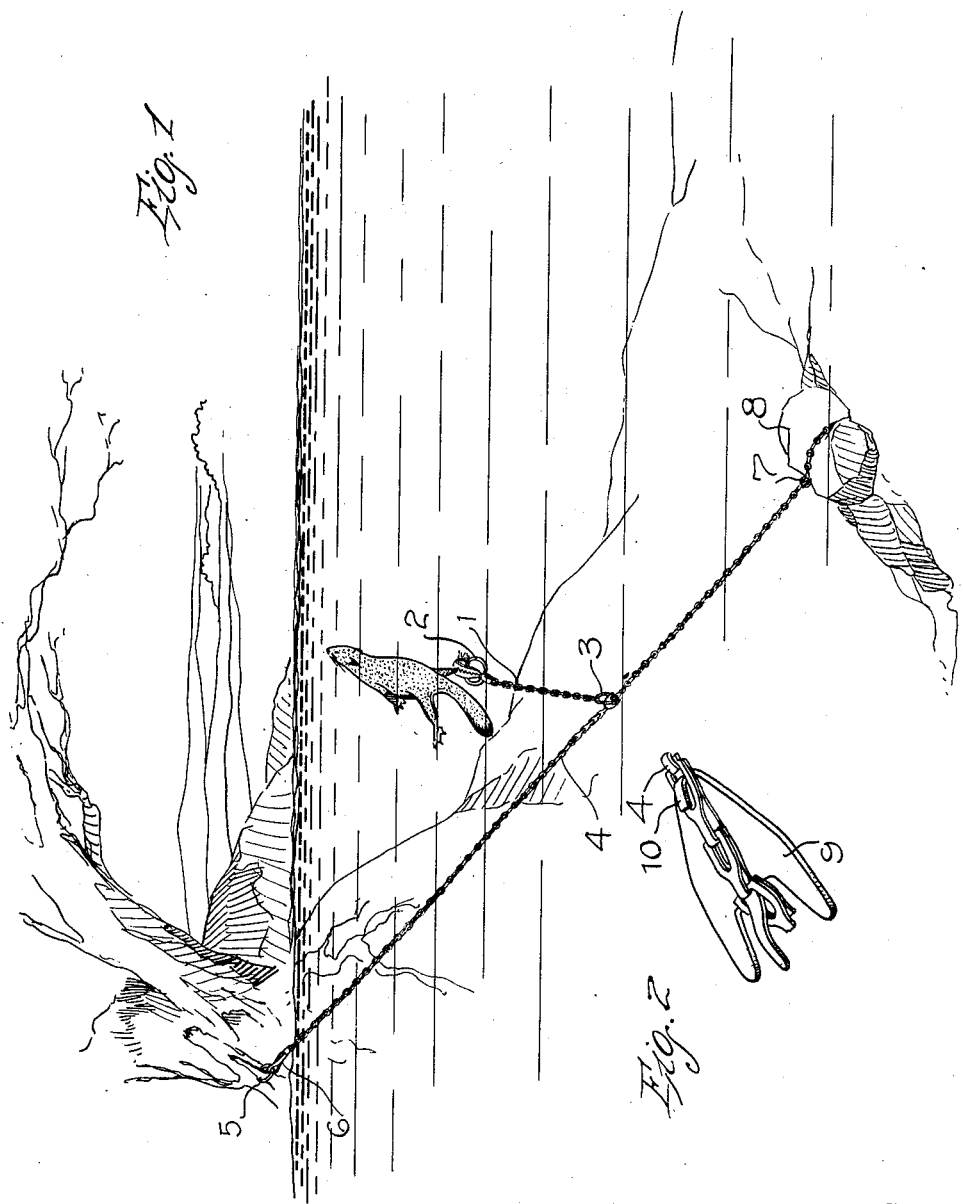
Witnesses
Robert M. Sutphen.
A. J. Hind.
Inventor
ARTHUR J. COLEMAN
By Watson E. Coleman
Attorney

UNITED STATES PATENT OFFICE.

ARTHUR J. COLEMAN, OF GREENFIELD, INDIANA.

ATTACHMENT FOR ANIMAL-TRAPS.

1,095,081. Specification of Letters Patent. Patented Apr. 28, 1914.

Application filed April 21, 1913. Serial No. 762,600.

*To all whom it may concern:*

Be it known that I, ARTHUR J. COLEMAN, a citizen of the United States, residing at Greenfield, in the county of Hancock and State of Indiana, have invented certain new and useful Improvements in Attachments for Animal-Traps, of which the following is a specification, reference being had to the accompanying drawings.

This invention relates to new and useful improvements in animal traps and more particularly to an attachment for musk-rat traps and my object is to provide a device which will prevent the animal, after being caught in the trap, from rising to the surface of the water.

A further object of the invention resides in providing an improved fork or hook member on the securing chain to prevent the ring of the attaching chain from being carried upwardly on the first mentioned chain.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application Figure 1 is a perspective view showing the device applied to use; and Fig. 2 is an enlarged perspective view of the improved fastener on the securing chain.

In describing my invention, I shall refer to the drawing in which similar reference characters designate corresponding parts throughout the several views and in which 1 indicates an attaching chain carried on a trap 2, particularly adapted for trapping musk-rats and other water animals of this character and the end of the attaching chain opposite that having the trap attached thereto is provided with an enlarged ring 3. A securing chain 4 is also provided, the same being disposed through the ring 3 and the one end thereof is engaged with an additional ring 5 through the medium of a snap hook 6. This ring 5 is adapted to be secured in any desired manner to the bank of a stream. The opposite or, what may be termed the outer, end of the securing chain 4 is provided with a smaller ring 7 and the lower portion of said chain 4 is looped through this latter ring and engaged with a weight 8. This weight is lowered to the bottom of the stream and thus the attaching chain with the trap thereon is properly secured for operation.

My invention primarily contemplates the provision of a means on the securing chain for the prevention of the drawing upwardly of the ring 3 on the chain 4 after an animal has been caught in the trap and to this end, I provide a fork-like plate 9. This fork-like plate tapers toward the end thereof opposite that having the prongs thereon and terminates at the last mentioned end in a hook or the like 10 which is engaged with one of the links of the chain. This fork-like plate is provided with three spaced prongs, the central of which is also adapted to be disposed through a link of the chain 4, said last mentioned prong being somewhat bowed to retain the same in engagement with the last mentioned link of the chain when once disposed therethrough. When this fork-like plate 9 is properly engaged with the chain in the manner above described, the outer prongs thereof will spread outwardly on opposite sides of said chain and the same will be securely held in position thereon.

It must be here stated that the ring 3 is applied on the chain 4 between this fork-like plate member 9 and the ring 5, and said ring member 3 is of such a diameter as to readily ride over the fork-like member 9 when carried downwardly along the chain. When drawn upwardly on the chain 4, however, after the same has been drawn over the fork-like member 9, said ring will be engaged with the prongs of said member 9 and prevented from moving farther on the chain. In practice, therefore, assuming that the device is set up for operation when an animal such as a musk-rat is caught in the trap 2, it immediately dives downwardly and outwardly into deeper water and thus the ring 3 will be carried downwardly on the chain 4 over the member 9. The animal will then attempt to rise to the surface of the water and as the ring is carried upwardly on the chain 4, the same will, as stated above, be engaged with the prongs of the member 9 and prevented from rising on said chain. Thus the animal will be retained under the water and drowned.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

In a trap of the class described, a chain suitably supported at its ends, a fork-like plate member having a trio of spaced prongs formed at one end thereof and tapered smaller toward its opposite end, the central of said spaced prongs being distorted and bent upwardly for disposition through one of the links of said chain adjacent the lower end of the latter, whereby to dispose the other two prongs on opposite sides of said chain, and an additional prong formed in continuation of the tapered end of said plate member and disposed through an additional link of said chain, said prong being bent inwardly toward the plate member to securely retain the latter on the chain.

In testimony whereof I hereunto affix my signature in the presence of two witnesses.

ARTHUR J. COLEMAN.

Witnesses:
CHAUNCEY W. DUNCAN,
ELMER JAMES.

---

Copies of this patent may be obtained for five cents each, by addressing the "Commissioner of Patents, Washington, D. C."